(No Model.)  4 Sheets—Sheet 1.
G. A. WATKINS.
MACHINE FOR SPLITTING CANE.
No. 588,516.  Patented Aug. 17, 1897.
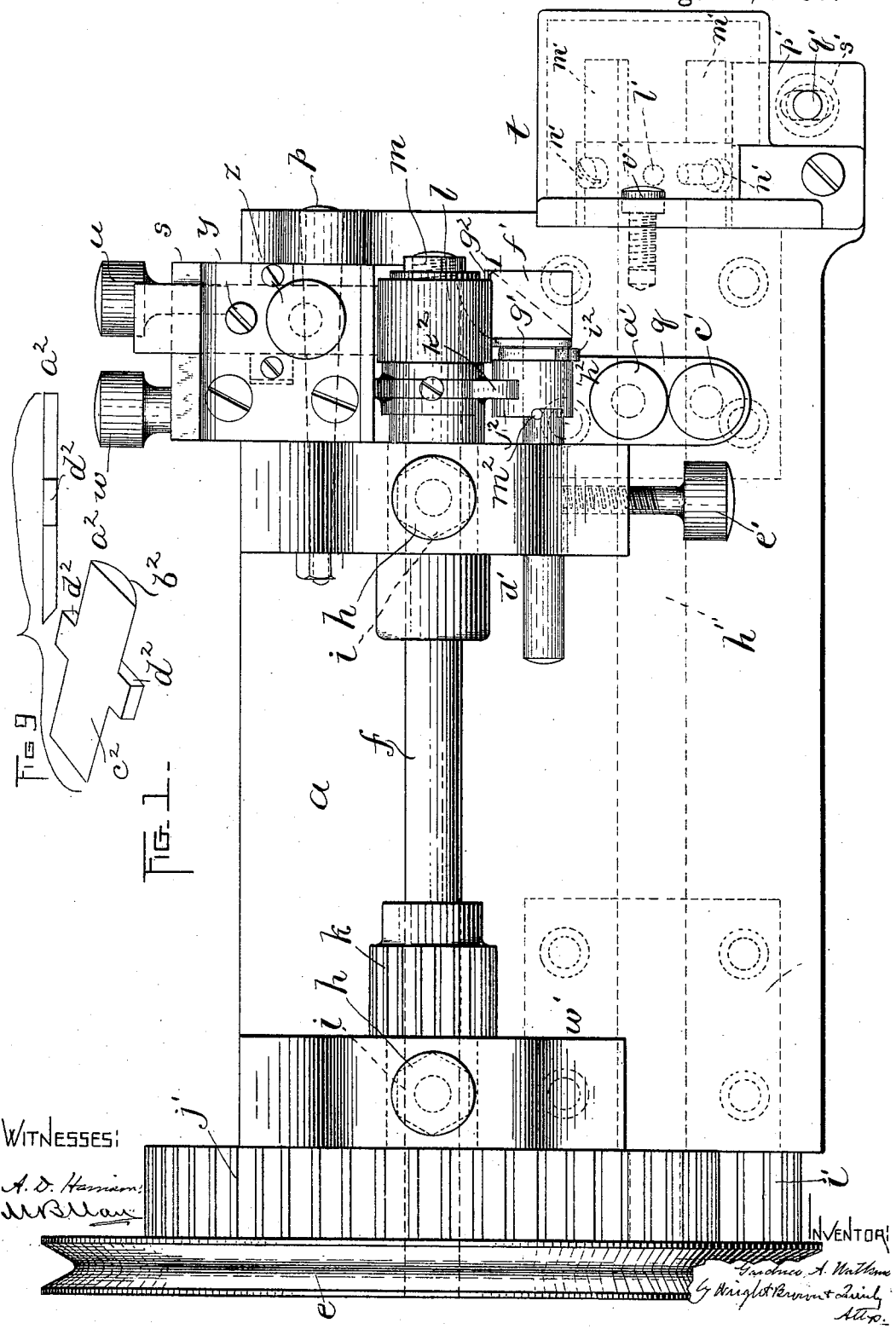
WITNESSES:
A. D. Harrison
M. B. May
INVENTOR
Gardner A. Watkins
By Wright, Brown & Quinby
Attys.
THE NORRIS PETERS CO., PHOTO-LITHO., WASHINGTON, D. C.

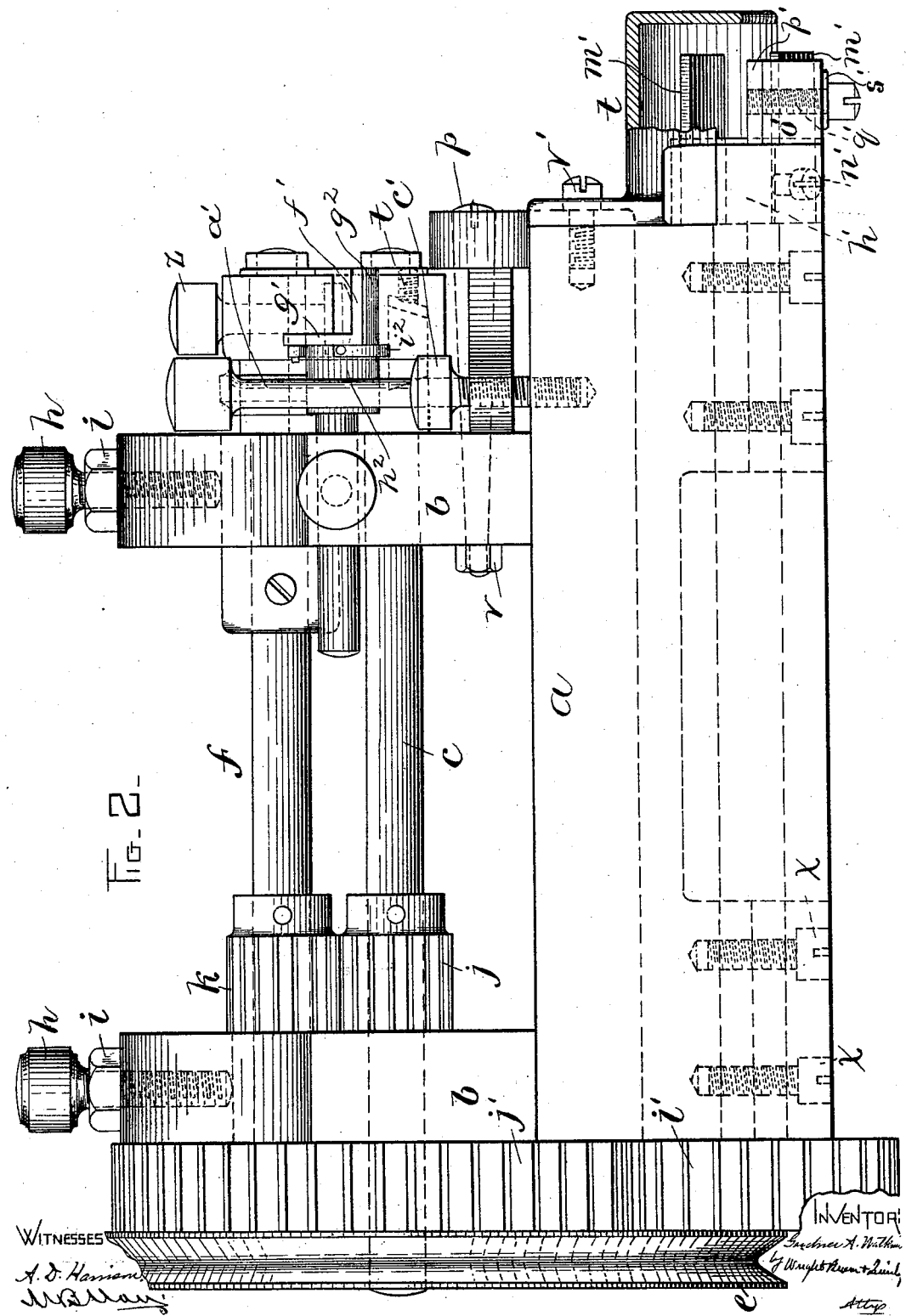

(No Model.)  4 Sheets—Sheet 3.
G. A. WATKINS.
MACHINE FOR SPLITTING CANE.
No. 588,516.  Patented Aug. 17, 1897.
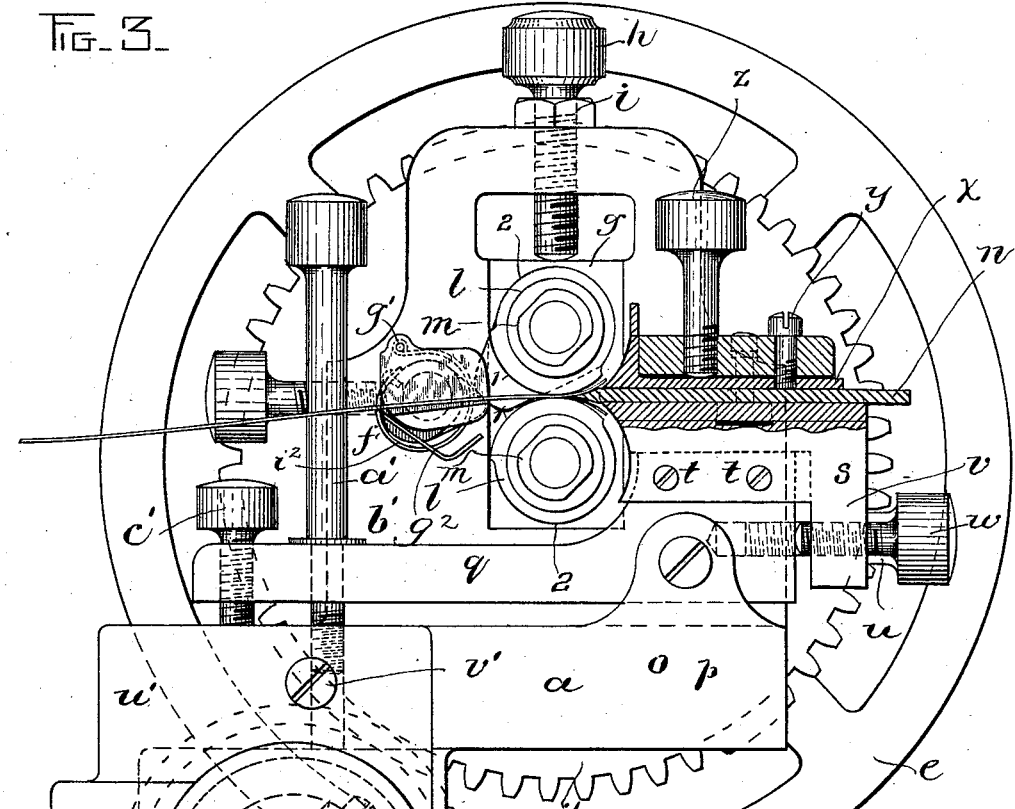
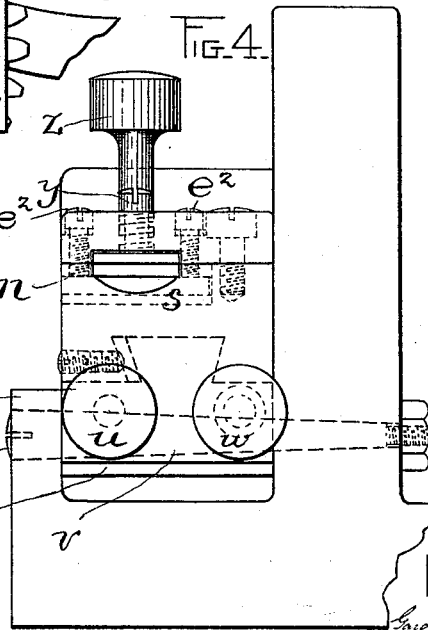
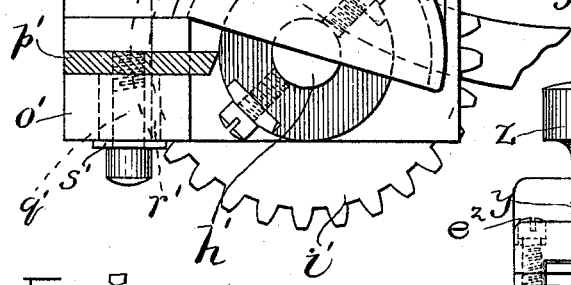
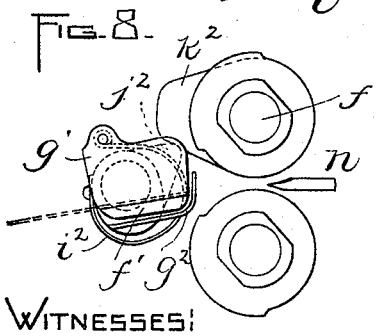
WITNESSES:
INVENTOR:

(No Model.) 4 Sheets—Sheet 4.
G. A. WATKINS.
MACHINE FOR SPLITTING CANE.
No. 588,516. Patented Aug. 17, 1897.
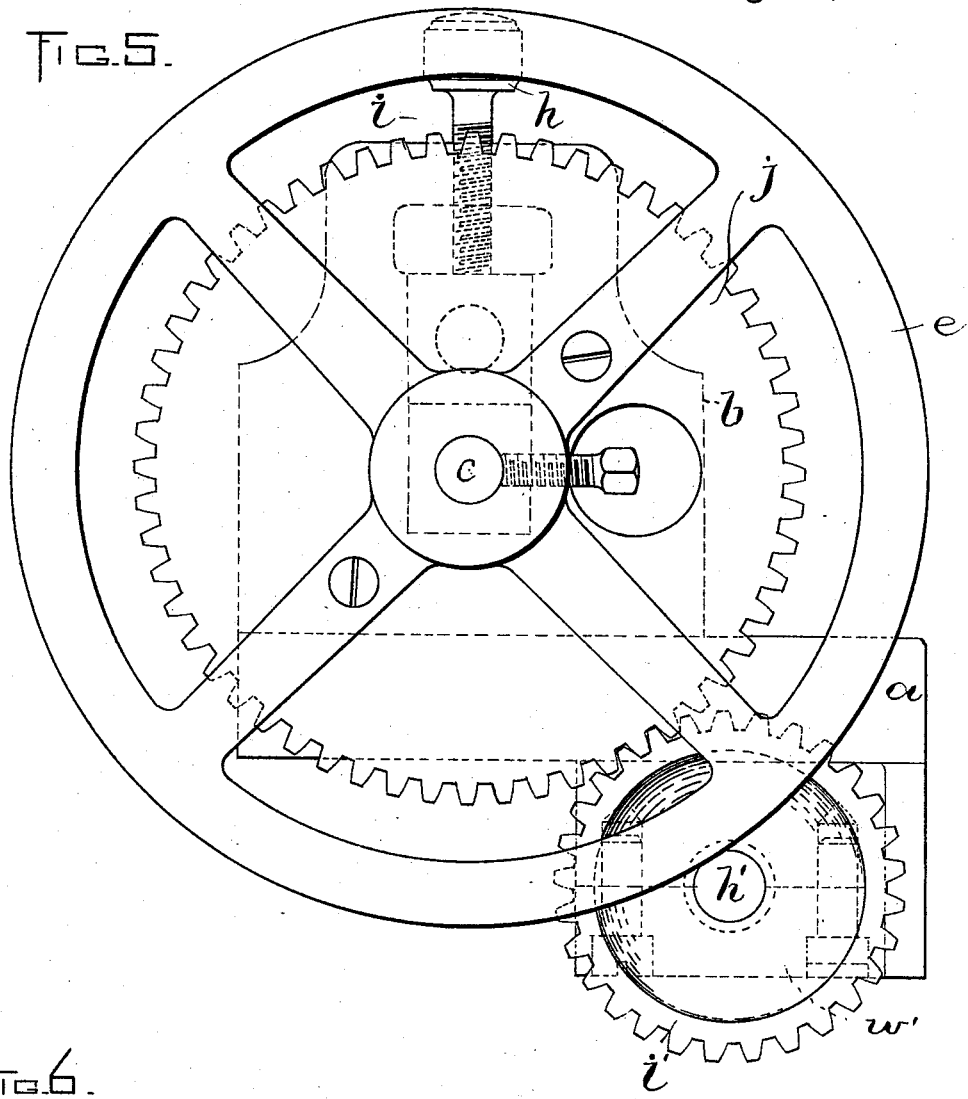
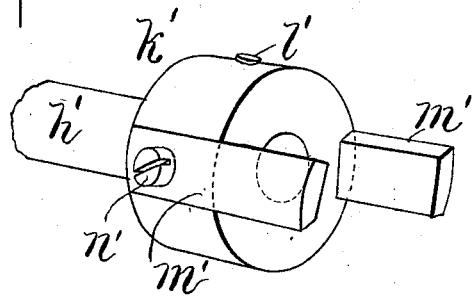
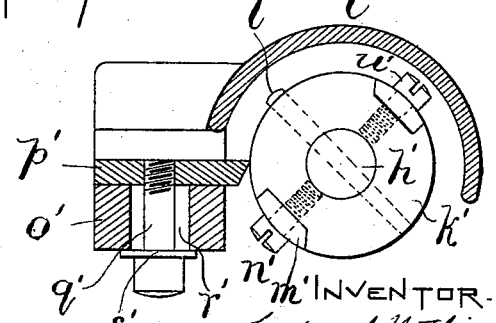
WITNESSES:
A. D. Harrison
M. B. May
INVENTOR.
Gardner A. Watkins
By Wright Brown & Quinby
Attys

UNITED STATES PATENT OFFICE.

GARDNER A. WATKINS, OF GARDNER, MASSACHUSETTS, ASSIGNOR, BY MESNE ASSIGNMENTS, TO THE HEYWOOD BROTHERS & WAKEFIELD COMPANY, OF SAME PLACE.

MACHINE FOR SPLITTING CANE.

SPECIFICATION forming part of Letters Patent No. 588,516, dated August 17, 1897.

Application filed July 25, 1896. Serial No. 600,462. (No model.)

*To all whom it may concern:*

Be it known that I, GARDNER A. WATKINS, of Gardner, in the county of Worcester and State of Massachusetts, have invented certain new and useful Improvements in Machines for Splitting Cane, of which the following is a specification.

The object of this invention is to provide a machine for cutting and splitting the ends of canes or rattans in the most expeditious and economical manner, it being also the object of the invention to construct the machine in such way that the canes will all be split to about the same extent.

To these ends, therefore, the invention consists of a machine provided with a cutting-blade against which the ends of the canes or rattans are fed, the feeding mechanism being constructed in such a way that when the canes have been split to the desired extent they may be withdrawn.

The invention also consists of a machine of the character described equipped with an adjustable rest for guiding and supporting the canes to the feeding-rolls; and it likewise consists in providing means for adjusting all of the several parts and securing them with great nicety at any adjustment.

It also also consists in providing a machine of the character described with automatic means coacting with the rest for guiding and supporting the canes to the feeding-rolls for insuring that the said canes shall be prevented from being fed against the knives except at a certain predetermined time.

The invention further consists in providing a machine for splitting the ends of the canes or rattans, and for also cutting the ends of the rattans transversely, as well as in equipping the machine with numerous other features of improvement, which I shall now proceed to describe more particularly and then point out in detail in the claims hereto appended.

Reference is to be had to the annexed drawings and to the letters and figures of reference thereon, the same letters and figures indicating the same or similar parts or features, as the case may be, wherever they occur.

Of the drawings, Figure 1 is a plan view of one form of the machine in which my invention is embodied. Fig. 2 is a front elevation of the same, a portion of the shield for the revolving cutter being broken away so as to show one of the cutter-blades. Fig. 3 is a side elevation, partially in section, showing the machine in the operation of splitting the end of a cane. Fig. 4 shows in detail the splitting-knife supporting-block and the knife. Fig. 5 is a side elevation of the machine, taken from the opposite side. Fig. 6 shows in perspective the revolving knives for cutting off the ends of the cane. Fig. 7 is a detail view, partly in section, showing the stationary ledger-blade and the revolving blades which act in conjunction therewith. Fig. 8 illustrates the shield attached to the rest on which the canes are guided to the feeding-rolls. Fig. 9 shows in detail the rocker-plate for the knife.

It will be understood that while I have illustrated upon the drawings and shall now describe that form of machine which at the present time appears to best embody the invention, yet at the same time I do not wish to be construed as in any wise limiting myself to the particular construction which I have shown, nor to all of the details which I am about to describe at length.

In the present embodiment of the invention I employ a bed-plate $a$, having upright standards $b\,b$, in which is journaled the power-shaft $c$. The latter is equipped with a belt-pulley $e$, by means of which power is imparted thereto, the belt-pulley being shown for convenience, as any other form of power-transmitting device may be equally well employed. $f$ is a shaft parallel to the shaft $c$ and journaled in bearing-blocks $g$, it being adjusted to exact parallelism with the said shaft $c$ by means of an adjusting-screw $h$, threaded into each standard $b$ and provided with a lock-nut $i$. The two shafts are connected by straight spur gear-wheels $j$ and $k$, as shown in Fig. 2.

Upon the outwardly-projecting ends of the two shafts I place feeding-rolls $l\,l$, which are of a peculiar shape—that is to say, each roll has the greatest portion of its periphery cut away, so as to present only a portion thereof to act upon the cane. The said rolls are secured upon the shafts $f$ and $c$ by means of lock-nuts $m$, and they are so arranged that the portions 3 3 of their peripheries coact to grasp a cane between them. It will be observed that as the rolls rotate the portions 3 3 will substantially come into contact for a portion of each rotation, there being a space between the two rolls when the portions 2 2 of the rolls are opposite each other. Hence when the rolls are rotating and a cane is presented to the action of the same the portions 3 3 will grasp the cane between them and draw it inward until the portions 2 2 of the peripheries are opposite each other, at which time the cane is released and may be withdrawn from between the rolls before the portions 3 3 again come into contact.

I arrange a blade $n$ in the tangential plane of the two rolls with its edge projecting between the rolls in such way that as the cane is fed to it by them it will be split, as illustrated in Fig. 3. The bed-plate $a$ is cast with an ear $o$, through which is passed a tapering pin $p$ (with screw-head) to support a movable knife-support $q$, the said pin $p$ being passed through one of the standards $b$ and provided on its smaller end with a nut $r$.

Secured to the knife-support $q$ is the knife-carrier $s$, which slides on a dovetail tongue on the said support. For adjusting the carrier toward and from the rolls I employ an adjusting-screw $u$, passed through an aperture in the depending arm $v$ of the carrier and threaded into an aperture in the support. After the carrier has been once adjusted it is locked in position by the gib-screws $t$ $t$.

$w$ is a set-screw threaded into the arm $v$ and abutting against the support. Thus the carrier may be adjusted by means of the screw $u$ and secured rigidly in adjustment by the set-screw $w$. The carrier is provided with a horizontal slot of a depth adequate to receive the knife-blade $n$ and an adjustable guide $x$. A small retaining-screw $y$ is passed through the top of the carrier and is threaded into the guide $x$, and serves to hold the guide in the slot of the carrier.

$z$ is a set-screw threaded into the top of the carrier $s$ and bears against the top of the guide $x$ to bind it and the knife-blade $n$ firmly therein. By loosening the screw $z$ the blade $n$ may be adjusted back and forth or may be removed from the carrier to be sharpened or repaired. The end of the carrier toward the roll is curved, as shown, the end of the guide $x$ being curved in the opposite direction, so that when the end of the cane is split by the blade $n$ the two halves are curved away from each other by the curved surfaces.

Generally speaking, I do not adjust the position of the knife relatively to the roll by means of the set-screw $z$, since I cannot thereby obtain that nicety of adjustment which is frequently necessary, this screw being for the purpose of permitting the knife-blade to be withdrawn, as aforesaid. The adjustment is usually obtained by means of the screws $w$ and $u$, since I am enabled by the use thereof to adjust the carrier with great accuracy.

It is sometimes found that the knife does not lie in exactly the tangent plane of the two rolls, and hence I provide means for giving it a rocking adjustment. This is accomplished by means of a rocking plate $a^2$, having a curved lower face $b^2$ and a flat upper face $c^2$, also having outwardly-extending transverse lugs or arms $d^2$. The plate lies in a curved depression in the carrier, with the lugs or arms $d^2$ lying in a transverse groove in the same.

$e^2$ $e^2$ are screws, each of which is threaded through the top plate of the carrier and rests against one of the lugs $d^2$. Thus by means of the said screws the rocking plate may be adjusted so as to adjust the edge of the knife relatively to the axes of the rolls.

I also provide adjusting devices for adjusting the knife-support around its pivot $p$. A screw $a'$, having a collar $b'$, resting upon the extending arm of the support, is passed through the said support and is threaded into an aperture in the base-plate $a$. Another screw $c'$ is threaded through the arm of the support and abuts against the bed-plate. By means of these two screws the whole support upon which the carrier is mounted may be adjusted and firmly held after adjustment.

When it is desired to split the end of a cane, the latter is presented to the action of the rolls and, being grasped thereby, is forced against the edge of the blade $n$, with the result that it is split, and the split ends are curved in opposite directions. As soon as the rolls release the cane, however, the latter is withdrawn and a fresh one is inserted in place.

For guiding the canes to the action of the rolls I provide an adjustable support or rest, which consists of a bar $d'$, passed through an aperture in one of the standards $b$ and held in any desired adjustment therein by means of a set-screw $e'$, threaded into the standard and bearing against the said bar. The outer end of the said bar is provided with a shelf or rest $f'$ and a vertical flange $g'$. The rest is arranged in front of the rollers and guides the canes as they are presented to the same. By employing the peculiarly-shaped rolls, having a portion of their peripheries cut away, so that the cane is grasped only by a portion of the same, I am enabled to provide means for splitting the canes to the same extent, since they will be split only as long as they are fed forward by the rolls, and the instant the feeding action ceases they may be withdrawn manually from the rolls.

In addition to the foregoing I provide an automatically-acting shield for preventing the cane from being fed to the rollers except when the rolls are just ready to grasp their ends, thereby relieving the operator from weariness and the difficult task of watching the rolls so as to present the ends of the cane at the proper times. The shield $g^2$ (see Figs. 2 and 8) projects out from a sleeve $h^2$, which is loosely mounted on the shaft and has a curved edge adapted to be raised up between the rest $f'$ and the rolls. The shield is held normally in its raised position by a spring $i^2$, one end of which is secured to the flange $g'$ of the rest $f'$ and the other end of which is secured to the sleeve $h^2$. The sleeve has a cam $j^2$, which is in position to be engaged by a cam $k^2$ on the shaft $f$ of the upper roll to displace the shield just when the ends of the portions 1 1 of the roller are nearing each other.

The operator places the ends of the canes on the rest, with their extremities pressing against the shield, and when the shield is displaced they are moved forward to be engaged by the rolls and fed to the knife, the movement of the shield being limited by a pin $m^2$, projecting up from the bar of the rest into a recess in the sleeve.

I provide a cutter to act in addition to the splitting mechanism for cutting off the ends of the canes. Suitably journaled in a bracket beneath the bed-frame $a$ is a shaft $h'$, equipped on its end with a gear-wheel $i'$, intermeshing with a large gear-wheel $j'$ on the main power-shaft $c$. The said shaft $h'$ projects beyond the edge of the bed-plate and is provided with a cutter-head $k'$, secured thereto by a pin $l'$, the said head being provided with longitudinally-extending cutters $m'$, secured in grooves in the periphery of the cutter-head by screws $n'$. Resting upon a bracket or shelf $o'$ in front of the cutter-head is a stationary ledger-blade $p'$, which is held at any desired adjustment relatively to the cutter-head by means of a screw $q'$, extending through a slot $r'$ in the shelf and threaded into an aperture in the said blade. The screw $q'$ is provided with a flange or washer $s'$, bearing against the shelf. When the shaft $h'$ is rotated through the medium of the aforesaid gear-wheels $i'$, the canes may be subjected to the action of the revolving cutters, the stationary blade acting as a rest for the canes and coacting with the cutters for shearing off the ends of the same.

$t'$ is a shield or hood semicylindrical in shape, so as to cover the revolving cutter-head, and provided with a flange $u'$ at the end, which is secured to the bed-plate $a$ by a screw $v'$.

From the foregoing it will be observed that I have presented a peculiarly simple machine for efficiently shearing the ends of canes and splitting the same. The parts are so constructed and related that they may be adjusted with great nicety, the whole machine being simple in construction and efficacious in operation. By reason of the adjusting devices for the knife-support the knife may be bodily adjusted vertically, while at the same time it may be adjusted horizontally or longitudinally by means of the adjusting devices for the knife-carrier. When the knife becomes worn, it may be easily removed by unscrewing the screw $z$, so that it may be sharpened or a new knife inserted instead. The knives of the cutting-head $k'$ may likewise be expeditiously removed to be sharpened, and the whole cutting-head may be removed from the shaft $h$ by withdrawing the tapering pin $l'$. The shearing or ledger blade $p'$, as aforesaid, not only serves as a rest for the canes during the operation of cutting off the ends of the same, but also coacts with the revolving cutters. The journal-caps $w'$ for the cross-shaft $h'$ may be removed by unscrewing the screws $x'$ $x'$, so that the revolving cutter may be taken off from the machine when desired.

The machine possesses other features of advantage to which it is not necessary to now refer.

Having thus described one form of machine in which my invention may be used without having attempted to set forth all of the forms in which the various parts thereof may be embodied, I now declare that what I claim is—

1. A machine for splitting cane comprising in its construction a stationary blade, means for feeding the cane longitudinally to the blade, a rest for the cane having a cylindrical supporting-bar adjustably mounted on the frame of the machine and having a stop, a spring-held rest journaled on said bar and adapted to engage said stop, and lying normally between the rest and the feeding means, and a cam for displacing said shield.

2. A machine for splitting canes comprising in its construction, a stationary blade, rolls coacting to feed the cane longitudinally to the blade, a rest for the canes, a shield interposed between the rest and the rolls, and journaled upon the rest, and a cam on one of the roll-shafts for intermittently displacing the shield.

3. A machine for splitting cane, comprising in its construction a frame, feeding-rolls for the cane, a blade for splitting the cane, a sliding carrier on which the knife is mounted, means for adjusting the knife-carrier, a pivoted knife-support for said carrier, and means for adjusting the said support about its pivot to move the knife bodily relatively to the rolls.

4. A machine for splitting cane comprising a frame, feeding-rolls for the cane, a splitting-blade for the cane, a support for the knife, a rocking plate between the blade and the support, and having ears $d^2$ $d^2$, and screws for bearing upon the ears and rocking said plate.

In testimony whereof I have signed my name to this specification, in the presence of two subscribing witnesses, this 20th day of July, A. D. 1896.

GARDNER A. WATKINS.

Witnesses:
 EDWARD G. WATKINS,
 DAVID R. COLLIER.